United States Patent [19]

Hirane et al.

[11] Patent Number: 5,138,310
[45] Date of Patent: Aug. 11, 1992

[54] LIGHT-EMITTING ELEMENT ARRAY DRIVER CIRCUIT

[75] Inventors: Hideo Hirane, Hitachi; Kiyohiko Tanno, Katsuta; Hisao Iizuka, Hitachi, all of Japan

[73] Assignees: Hitachi, Ltd.; Hitachi Cable, Ltd., Tokyo, Japan

[21] Appl. No.: 605,394

[22] Filed: Oct. 30, 1990

Related U.S. Application Data

[63] Continuation of Ser. No. 184,025, Apr. 20, 1988, Pat. No. 4,967,192.

[30] Foreign Application Priority Data

Apr. 22, 1987 [JP] Japan ............................. 62-97387
May 13, 1987 [JP] Japan ............................. 62-114699

[51] Int. Cl.$^5$ ............................................. G09G 3/00
[52] U.S. Cl. ................................. 340/811; 340/782; 340/815.03; 346/107 R; 346/108; 346/110 R
[58] Field of Search ............ 340/762, 782, 811, 815.03, 340/767, 793; 346/108, 110 R, 160, 107 R

[56] References Cited

U.S. PATENT DOCUMENTS

| | | | |
|---|---|---|---|
| 4,005,404 | 1/1977 | Soobik | 340/762 |
| 4,319,285 | 3/1982 | Minerd | 358/298 |
| 4,424,523 | 1/1984 | Snelling et al. | 340/107 R |
| 4,435,064 | 3/1984 | Tsukada et al. | 355/70 |
| 4,463,364 | 7/1984 | Tamura | 346/108 |
| 4,491,875 | 1/1985 | Kawamura | 358/298 |
| 4,499,459 | 2/1985 | Sasaki et al. | 340/752 |
| 4,536,778 | 8/1985 | De Schamphelaere et al. | 346/160 |
| 4,571,602 | 2/1986 | De Schamphelaere et al. | 346/160 |
| 4,596,992 | 6/1986 | Hornbeck | 346/107 R |
| 4,596,995 | 6/1986 | Yamakawa et al. | 346/160 |
| 4,633,271 | 12/1986 | Segawa et al. | 346/107 R |
| 4,689,694 | 8/1987 | Yoshida | 346/108 |
| 4,746,941 | 5/1988 | Pham et al. | |
| 4,750,010 | 6/1988 | Ayers et al. | 358/298 |
| 4,799,057 | 1/1989 | Takeda et al. | 340/811 |
| 4,831,395 | 5/1989 | Pham et al. | 346/154 |

FOREIGN PATENT DOCUMENTS 59-127468  1/1983  Japan .

Primary Examiner—Ulysses Weldon
Assistant Examiner—M. Fatahiyar
Attorney, Agent, or Firm—Antonelli, Terry, Stout & Kraus

[57] ABSTRACT

A driver IC of a light-emitting diode array head for an electronic photograph printer includes a current mirror circuit having a reference element and at least an output element so as to produce a reference current by use of a digital signal as an input thereto, a reference current source capable of outputting a plurality of reference current values, a selection circuit for specifying and selecting one of a plurality of reference current values from the reference current source, to be applied as an input current to the current mirror and an output control circuit for controlling the on and off states of an output current to be supplied to the output element of the current mirror circuit in accordance with a light emission control signal externally supplied. In connection with such a driver IC for a light-emitting diode array, there is implemented, furthermore, a bidirectional data scan with a reduced number of register circuits by employing in connection with n-data lines constituting a data bus, a group of register blocks each one thereof having n registers and which are operatively coupled so as to provide image data stored in the n registers to a plurality of driver circuits which switch ON/OFF the correspondingly associated light-emitting diodes. Furthermore, in connection with the register blocks, the driver also employs a bidirectional shift register for sequentially providing corresponding timing signals to each of the memory blocks.

18 Claims, 12 Drawing Sheets

LIGHT-EMITTING ELEMENT ARRAY DRIVER CIRCUIT

This is a continuation of application Ser. No. 07/184,025, filed Apr. 20, 1988 now U.S. Pat. No. 4,967,192.

BACKGROUND OF THE INVENTION

The present invention relates to a light-emitting element array device and a light-emitting element driver circuit employed as a light source for a recording operation in a printing apparatus of an electronic photography, and in particular, to a light-emitting element array device, a light-emitting element driver circuit, and a light-emitting element array driver integrated circuit (IC) suitable for controlling a driving current volume in a multi-stage fashion.

FIG. 10 shows an example of a driving operation of a light-emitting diode array as an example of a prior-art light-emitting element array. The configuration of FIG. 10 includes a driver IC 1 as a light-emitting element driver circuit, a light-emitting diode array LED, and a limiting resistor R. As can be seen from FIG. 10, a constant-current driving operation is achieved by inserting a limiting resistor in series. The conventional driver IC 1 employed in this constitution operates as follows.

In the driver IC 1 having an input terminal DI for a shift register SR and a shift clock terminal CLK, image data is sequentially fetched into the shift register SR in response to the shift clock. A latch circuit LATCH temporarily holds the image data fetched into the shift register SR and is operated in accordance with an input latch strobe from a terminal LST. DST indicates an input terminal to enable drivers $D_1$ to $D_N$; and a driver strobe signal therefrom is used to open a gate G so as to set the pertinent driver to a conductive state when the output data from the latch LATCH is "1". $Q_1$ to $Q_N$ are output terminals of the respective drivers $D_1$ to $D_N$ and function as power supply circuits to conduct electric power to the light-emitting diode array LED via the respective limiting registers Rs. The current conducted to each light-emitting diode is a constant current of $$\frac{E - V_F}{R}$$

determined by the power source voltage E and a forward-directional voltage drop in the light-emitting diode $V_F$. DO indicates a serial output terminal of the shift register SR, which is disposed to transfer image data to the next driver IC because the light-emitting diode array head usually includes several thousand of elements and hence many driver ICs are used.

In FIG. 10, reference numeral 10 designates a light-sensitive drum on which a latent image of printing information is produced by lights emitted from the light-emitting diodes in accordance with the image data.

A circuit of this kind has been described, for example, in the JP-A-61-185981.

A light-emitting diode array is formed on a single wafer according to the semiconductor technology. Ordinarily, since a light output power of the light-emitting diode array greatly varies in the overall wafer, a portion thereof in which the variation of the light emission power is small is cut out as a chip to be used. In a light-emitting diode array head in which a plurality of such separate semiconductor chips are arranged, the fluctuation of the light emission power is reduced; however, there still remain variations in the light emission among elements and among chips. Consequently, when an image of the electronic photography is produced with such a diode array head driven by a constant current, there appears a variation in the density thereof, which leads to a problem that the picture or image quality is deteriorated.

In addition, the light emission power of the light-emitting diode array may be attended with a change that becomes apparent with a lapse of time in some cases. As a result, the density of the image of the electronic photography is increased or decreased with the lapse of time. Consequently, it thereby becomes necessary to change the driving current with the lapse of time. Since the output current volume cannot be controlled in the conventional driver IC chip, a variation in the limiting resistance must be used to cope with this problem. The limiting resistor is manufactured on a print head substrate on which the chip is mounted and, as a result, it would be difficult to work on the limiting resistor to set the resistance value thereof again, which leads to a problem of the conventional technology that the limiting resistor cannot be corrected with respect to the change associated with the lapse of time.

In the conventional driver IC, in order to shift data in a bidirectional fashion, the flip-flop circuits FFs required for the shift register are twice as many as those employed for the single-directional operation. As a result, the size of the driver IC is necessarily increased and hence the size of the light-emitting array head on which the driver IC is mounted is also increased, which leads to the problem of the prior art that the cost of the array head is soared.

SUMMARY OF THE INVENTION

It is therefore an object of the present invention to provide a driver circuit and a light-emitting element array system capable of removing the deterioration of the picture quality caused by the fluctuation in the light emission power of the light-emitting diode array and by the change thereof with the lapse of time.

Another object of the present invention is to provide a driver IC for a light-emitting diode array implementing a bidirectional data scan with a reduced number of register circuits so as to minimize the cost of the driver IC.

The first object above is accomplished by controlling, in a multi-stage fashion, the output current volume from the driver circuit driving light-emitting elements depending on a digital signal.

The control circuit basically includes a current mirror circuit such that the reference current controlling the output current volume is supplied by use of a digital current control signal. The current control signal is constituted with n bits, and the reference current corresponding to each bit is different from the other reference current so as to determine the output current volume by the total of the reference current values.

The n-bit current control signal is associated with $2^n$ kinds of reference current values, and hence the output current is controlled in the corresponding number of stages, namely, $2^n$ stages. A driving current controlling the fluctuation in the light emission power of the light-emitting diode array can be readily attained from the control range, namely, the variation in the light emission power can be reduced by supplying a current control signal corresponding to the obtained driving current. Through a jumper connection of the input terminal to "1" or "0" or by writing the pertinent data into an integrated register circuit, the current control signal is supplied, which consequently facilitates the reset operation to change the value of the signal required in the correction associated with the change in the light emission power of the light-emitting diode array with respect to the lapse of time.

In order to achieve the second object of the present invention, n data input terminals are extended to dispose a data bus, and there are disposed m blocks each including n registers connected in an array in accordance with an order so as to be connected to the data bus, and the bidirectional operation is effected by means of a timing generator which enables the register blocks.

In the operation according to the present invention, different from the conventional operation in which data itself repeatedly moves through the inputs and outputs associated with the registers in series so as to attain the directionality, the input timing to the register blocks acts upon the directionality. Since the timing signal is generated only to operate the m register blocks in the bidirectional fashion, the circuit size of the timing generator can be minimized when compared with that conventionally used for the bidirectional data shift operation.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
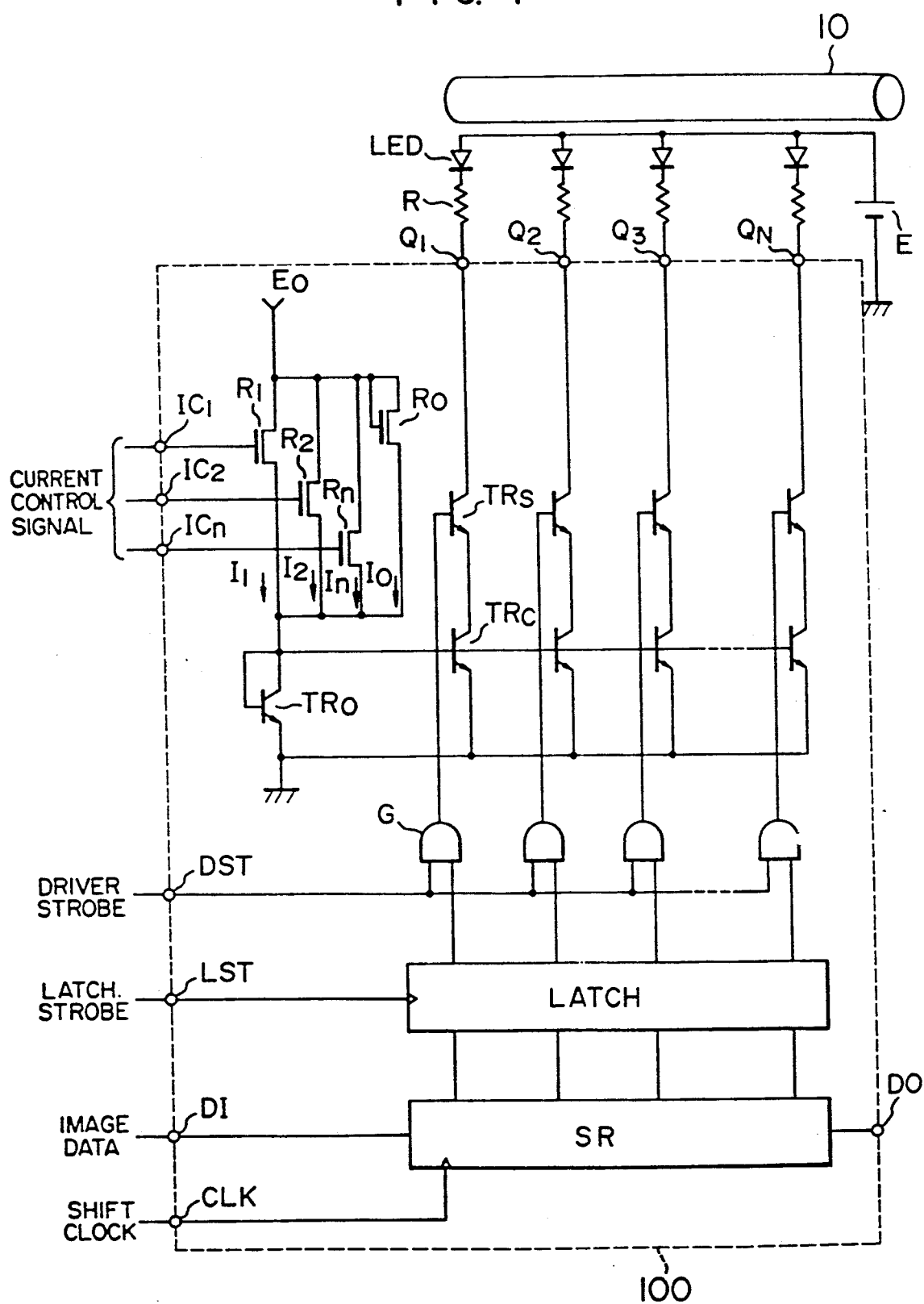
FIG. 1 is a circuit diagram of a driver IC as an embodiment according to the present invention.

Next, referring to the drawings, description will be given in detail of an embodiment according to the present invention. FIG. 1 shows a first embodiment associated with an electronic photograph system as a driver IC according to the present invention. A driver IC 100 is preferably integrally formed in a single semiconductor substrate. Light-emitting diodes LEDs, and a photosensitive drum 10 are substantially the same as those of the conventional example described above.

Figure 2:
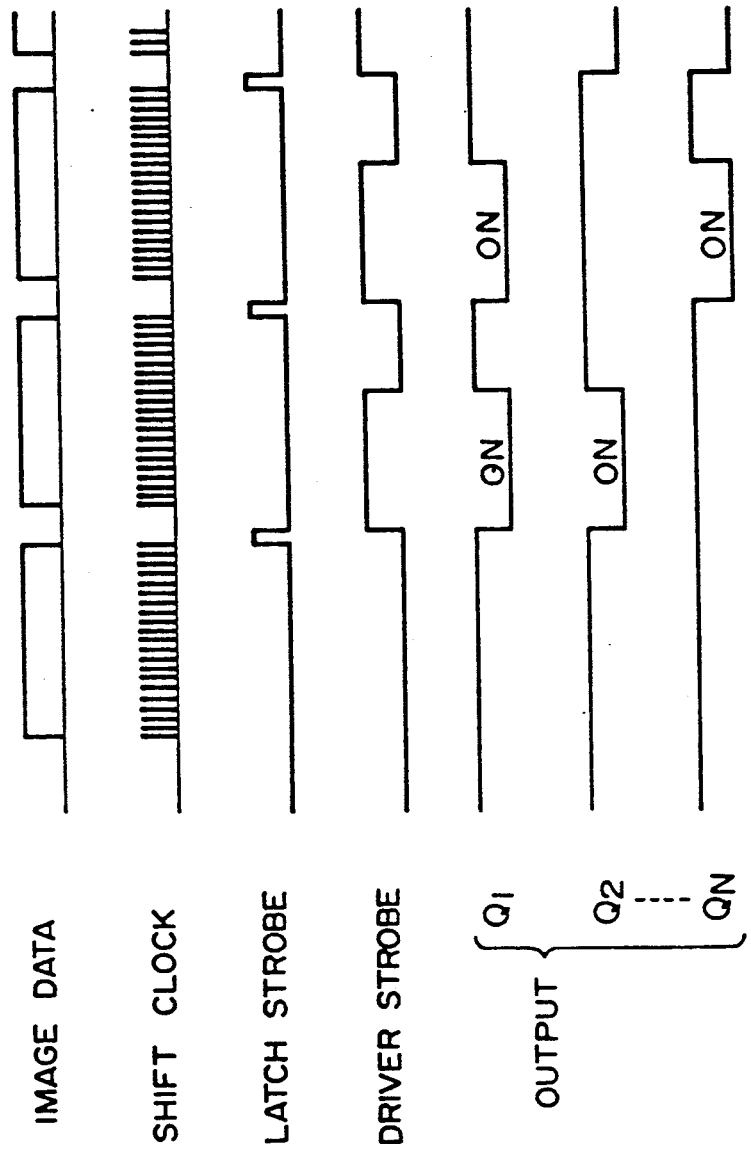
FIG. 2 is a timing chart useful to explain operations of the embodiment of FIG. 1.

FIG. 2 shows a timing chart of operations in the driver IC 100. Image data or picture data from an external device is received via a terminal DI so as to be fetched in synchronism with a shift clock into a shift register including an MOS transistor as first register means. CLK indicates the input terminal of the shift clock. DO is a serial output terminal of the shift register when a plurality of driver ICs 100-1, 100-2, ..., 100-n (not shown) are connected in a cascade. In the case where a plurality of LEDs are to be driven, the image data is delivered to the adjacent driver ICs 100-1, 100-2, ..., or 100-n (not shown). When the image data is stored in the predetermined position of the shift register SR, a latch strobe signal is inputted from a terminal LST so as to hold the picture data in a latch circuit LATCH including an MOS transistor as second register means. The image data is held therein until the next image data is stored in the shift register and a latch strobe is inputted again to latch the image data. In this period of time, the image data is being outputted to the gates Gs including MOS transistors. When the gates Gs are opened in response to a driver strobe signal supplied from the terminal DST, the image data is delivered as switching signals to the driver.

The driver includes a switching transistor TRS receiving the image data to effect a switching operation and a constant-current transistor TRC connected thereto in series. The driver section has output terminals $Q_1$ to $Q_N$. The constant current is controlled by use of a current mirror circuit including a bipolar transistor $TR_0$ as a reference element and a bipolar transistor TRC as an output element. Between a current of $TR_0$ and a current of TRC, there exists a constant ratio such that the output current is restricted by the reference current flowing through $TR_0$. In this configuration, the control of the constant current by $TR_0$ is effected in a multi-output operation and is associated with all outputs of the chip 100. The reference current is determined by the reference current source including a parallel connection of MOS transistors $R_0$, $R_1$, $R_2$, ..., and $R_n$ of which an end is connected to the transistor $TR_0$ and of which the other end is connected to the reference voltage $E_0$. The reference current is attained as the total of the current values $I_0$, $I_1$, $I_2$, ..., and $I_n$ flowing in the respective resistors.

The MOS transistor $R_0$ is constantly in the on state when the gate terminal thereof is set to level "1" and the current flowing therethrough is $I_0$ as described above. The gate terminals of the MOS transistors $R_1$, $R_2$, ..., and $R_n$ are connected to terminals $Ic_1$, $Ic_2$, ..., and $Ic_n$, respectively such that the switching controls are achieved in response to the current control signals supplied from an external device in the form of logical level of "1" or "0". In accordance with the current control signal, each transistor takes one of two values including a resistance value of the on state and the value of the off state, namely, the infinite value. Consequently, when the current control signal includes n bits, the reference current as the total of the current values can develop $2^n$ different of current values. In an example for n=3, $2^3=8$ kinds of reference current values can be attained as shown in Table 1.

TABLE 1

Relationships between reference current and current control signal

| No. | Current control signal | | | Reference current | |
|---|---|---|---|---|---|
| | $Ic_3$ | $Ic_2$ | $Ic_1$ | ( ) for $I_2 = 2I_1$ and $I_3 = 2^2I_1$ | |
| 1 | 0 | 0 | 0 | $I_0$ | ($I_0$) |
| 2 | 0 | 0 | 1 | $I_0 + I_1$ | ($I_0 + I_1$) |
| 3 | 0 | 1 | 0 | $I_0 + I_2$ | ($I_0 + 2I_1$) |
| 4 | 0 | 1 | 1 | $I_0 + I_1 + I_2$ | ($I_0 + 3I_1$) |
| 5 | 1 | 0 | 0 | $I_0 + I_3$ | ($I_0 + 4I_1$) |
| 6 | 1 | 0 | 1 | $I_0 + I_1 + I_3$ | ($I_0 + 5I_1$) |
| 7 | 1 | 1 | 0 | $I_0 + I_2 + I_3$ | ($I_0 + 6I_1$) |
| 8 | 1 | 1 | 1 | $I_0 + I_1 + I_2 + I_3$ | ($I_0 + 7I_1$) |

In this table, the MOS resistance values in the parentheses are expressed in the exponent form with the base of 2 as $I_2 = 2 \cdot I_1$, $I_3 = 2^2 \cdot I_1$, and so forth. The variable values are represented in eight steps with an interval therebetween set as $I_1$, and the input current control signal can be expressed by binary codes with which the user is familiar. As described above, since the reference current is represented in the multi-value representation, the output current is controlled in eight stages of current values. Consequently, when the current control signal is supplied to attain an output current correcting the fluctuation of the light emission power from the light-emitting diode array by checking the light emission power from the light-emitting diode array, the driver operation can be effected to remove the fluctuation in the light emission power. The input of the current control signal is enabled only by connecting the input terminals $Ic_1$ to $Ic_n$ to $V_{DD}$ or the ground terminal by use of jumper means such as a wire bonding, which facilitates the resetting operation necessary in a case where the light emission power from the light-emitting diode array varies with the lapse of time.

Figure 3:
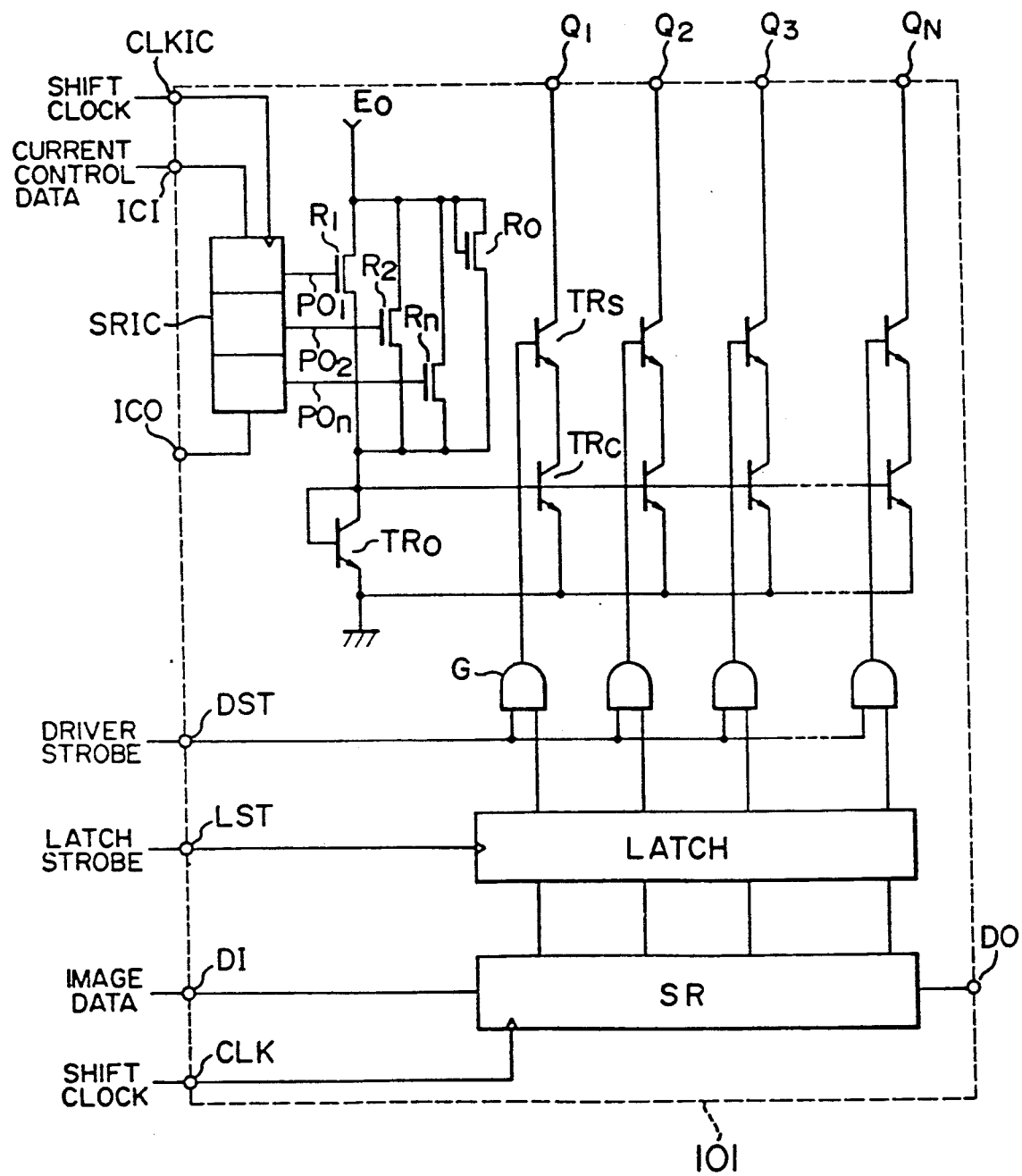
FIGS. 3 to 6 are circuit diagrams respectively showing driver ICs as other embodiments according to the present invention.

FIG. 3 shows a driver IC 101 as a second embodiment according to the present invention, which is completely identical to the drive IC 100 of the first embodiment excepting the input configuration of the current control signal. In FIG. 3, the light-emitting diodes LEDs, the photosensitive drum 10, and the like are omitted. The registers are integrally formed such that the input of the current control signal can be software-wise effected in the online operation. The constitution of FIG. 3 comprises a shift register SRIC as store means for storing n-bit current control data, a data input terminal ICI of SRIC, a shift clock input terminal CLKIC thereof, and a data output terminal ICO thereof. The terminal ICO is disposed for the continuous connection when a plurality of drivers ICs 101 are employed. Parallel outputs $PO_1$, $PO_2$, ..., and $PO_n$ of the shift register SRIC are respectively connected to gate terminals of MOS transistors $R_1$, $R_2$, ..., and $R_n$ so as to generate a reference current depending on the current control data inputted to the shift register SRIC, thereby controlling the output current volume in the multiple stages in a similar fashion as that of the first embodiment.

The current control data is prepared according to the light emission characteristics of the light-emitting diode array to be connected and is beforehand stored in a read-only memory or the like located externally with respect to the IC 101 or in a store section (not shown) in the IC 101. At the power-on operation, prior to a sequence of image data scan operations, or in synchronism with the image data scan operation in some cases, the current control data can be inputted by writing the current control data in the shift register SRIC.

As described above, according to the embodiment, in addition to the effect of the first embodiment, there is attained an effect that the system can be operated in the on-line fashion because the output current volume is set through a write operation into the register, not through the hardware means of the jumper connection. Consequently, a light-emitting diode array head utilizing the driver and the main system (for example, an electronic photograph apparatus) including the light-emitting diode array head need not be stopped.

Figure 4:
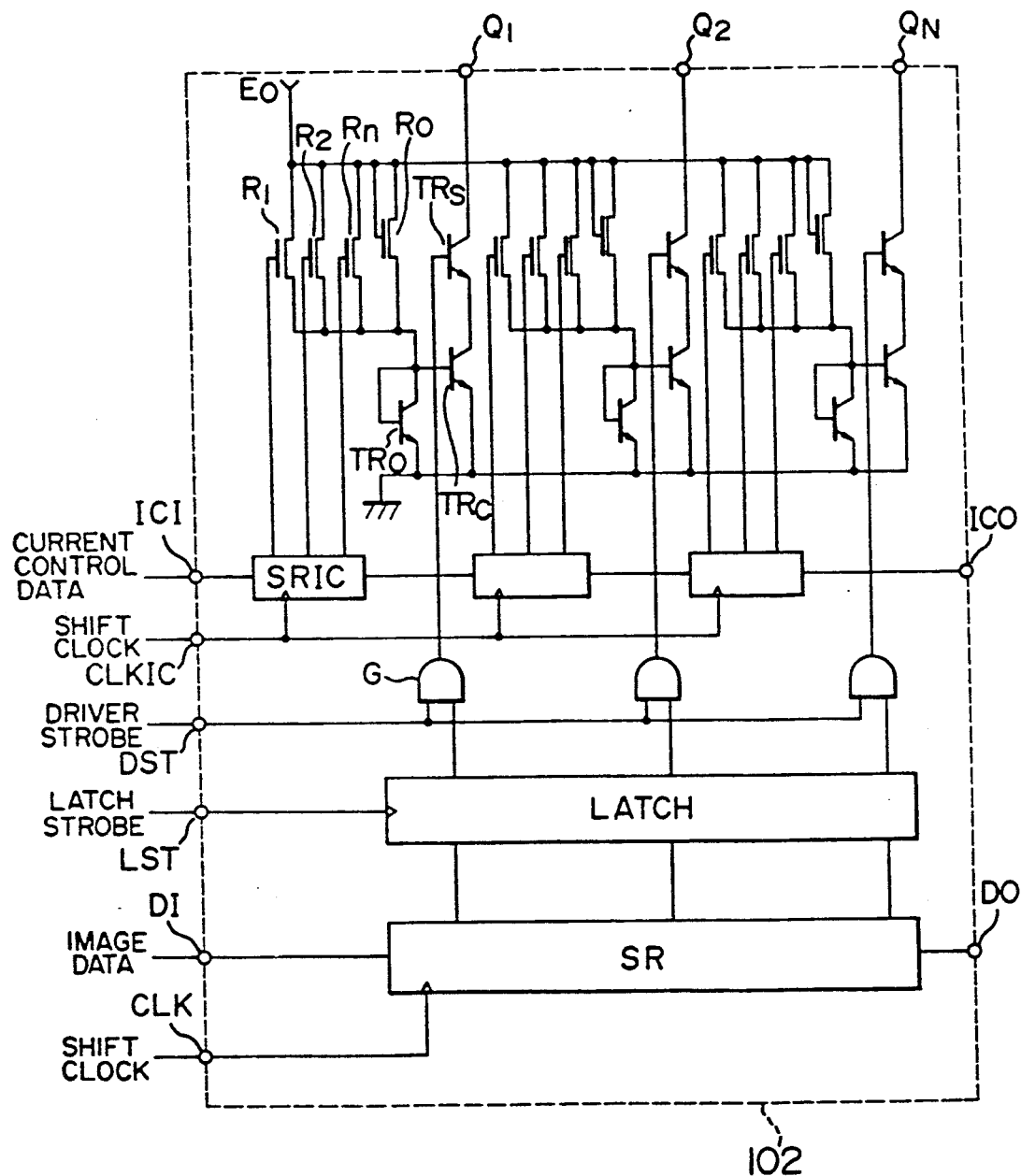

FIG. 4 shows the circuit configuration of a driver IC 102 as a third embodiment according to the present invention.

Constitutions and operations associated with the image scan of the shift register SR, the latch circuit LATCH, the gate G, and respective input and output terminals DI, DO, CLK, LST, and DST are completely the same as those of the first embodiment described with reference to FIGS. 1 and 2. Incidentally, also in FIG. 4, the light-emitting diodes LEDs, the light-sensitive drum 10, and the like are omitted. The different point of this embodiment resides in that the current volume control element including the register SRIC storing the current control data, the MOS transistors $R_0, R_1, ...,$ and $R_n$, and the transistor $TR_0$ is provided for each of the outputs $Q_1, Q_2, ...,$ and $Q_n$. The registers are connected in a cascade to form a shift register configuration having three terminals, namely, a data input terminal ICI, a shift clock input terminal CLKIC, and a data output terminal ICO.

A current control signal digitalized according to the light-emitting characteristic of each light-emitting element of the light-emitting diode array is inputted to the shift register SRIC in synchronism with a shift clock supplied from the terminal ICI prior to the image data scan. Current control data as an input is supplied to the MOS transistors through a serial-to-parallel conversion effected by the shift register SRIC so as to prepare the reference current for the current volume control. Consequently, for each element of the light-emitting diode array connected to the outputs $Q_1, Q_2, ...,$ and $Q_N$, the driving current is controlled to attain a constant light emission therefrom, an electronic photo image thus attained develops high quality in which the density variation is not found even in a microscopic aspect. Furthermore, since the operation to set the current volume can be arbitrary effected in the online operation, a stable image is attained in any cases.

Figure 5:
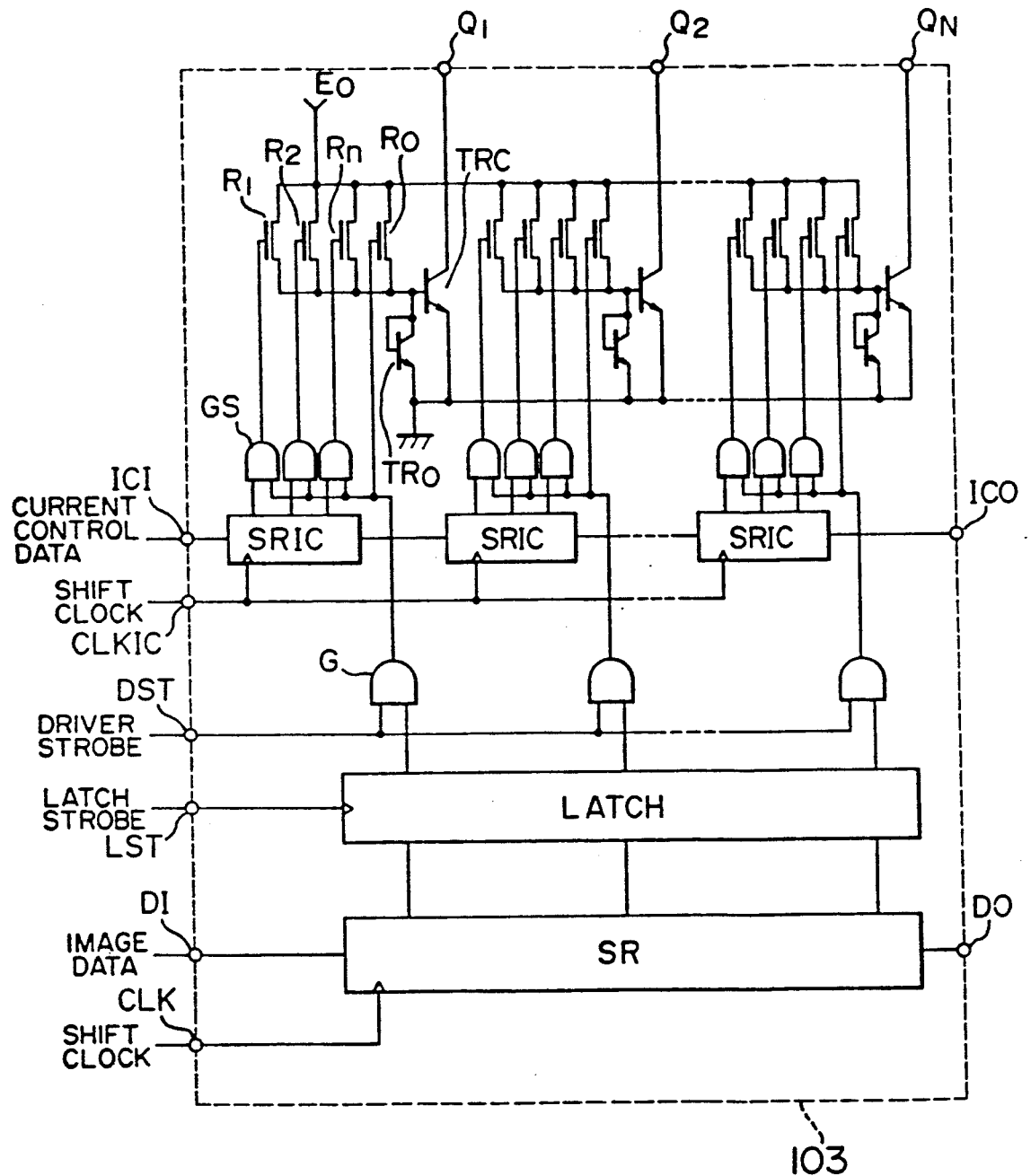

FIG. 5 shows the configuration of a drive IC 103 as a fourth embodiment according to the present invention in which the current volume is controlled for each output. In this configuration, the section including the shift register SR, the latch circuit LATCH, and the gates Gs is associated with the image data scan and is the same as that described in conjunction with the first, second, and third embodiments. Incidentally, the light-emitting diode LED, the photo-sensitive drum 10, and the like of FIG. 1 are omitted.

The configuration of FIG. 5 comprises a shift register SRIC storing current control data, a gate GS controlling a parallel output from the shift register SRIC, transistors $TR_0$ and $TR_C$ constituting an output driver in the form of a currant mirror circuit, and MOS transistors $R_0, R_1, ..., R_n$ supplying the reference current to the current mirror circuit.

The current control data is beforehand supplied to the shift register SRIC in response to the shift clock from the terminal ICI prior to the initiation of the image data scan. The parallel output from the shift register SRIC is connected to the MOS transistors $R_1$ to $R_n$ via the respective gates GSs. The gate GS is opened or closed depending on the output from the pertinent gate G, the output including image data. The output from the gate G is further connected to the gate terminal of the MOS transistor $R_0$ so as to directly effect a switching thereof. Consequently, when the output from the gate G includes image data of "0", the MOS transistor $R_0, R_1, \ldots$, and $R_n$ are entirely in the off state and are of the infinite resistance value, and hence the reference current does not flow. As a result, the transistor TRC is not conductive. For the image data "1", the MOS transistors $R_0$ becomes conductive, and at the same time, the gate GS is opened such that the MOS transistors $R_1$ to $R_n$ operate in accordance with the data stored in the shift register SRIC, thereby supplying $TR_0$ with the reference current similar to that of the first embodiment. As a result, the output transistor TRC becomes conductive and the current therethrough is limited to the value proportional to the reference current. As described above, the switching of the reference current is accomplished by use of the image data so as to control the conductive and non-conductive states of the output current.

The current control data is here generated depending on the light-emitting characteristic of each element of the light-emitting diode array connected to the respective outputs.

According to the embodiment above, since a transistor is omitted from each output section, the size of the drive IC can be reduced.

Figure 6:
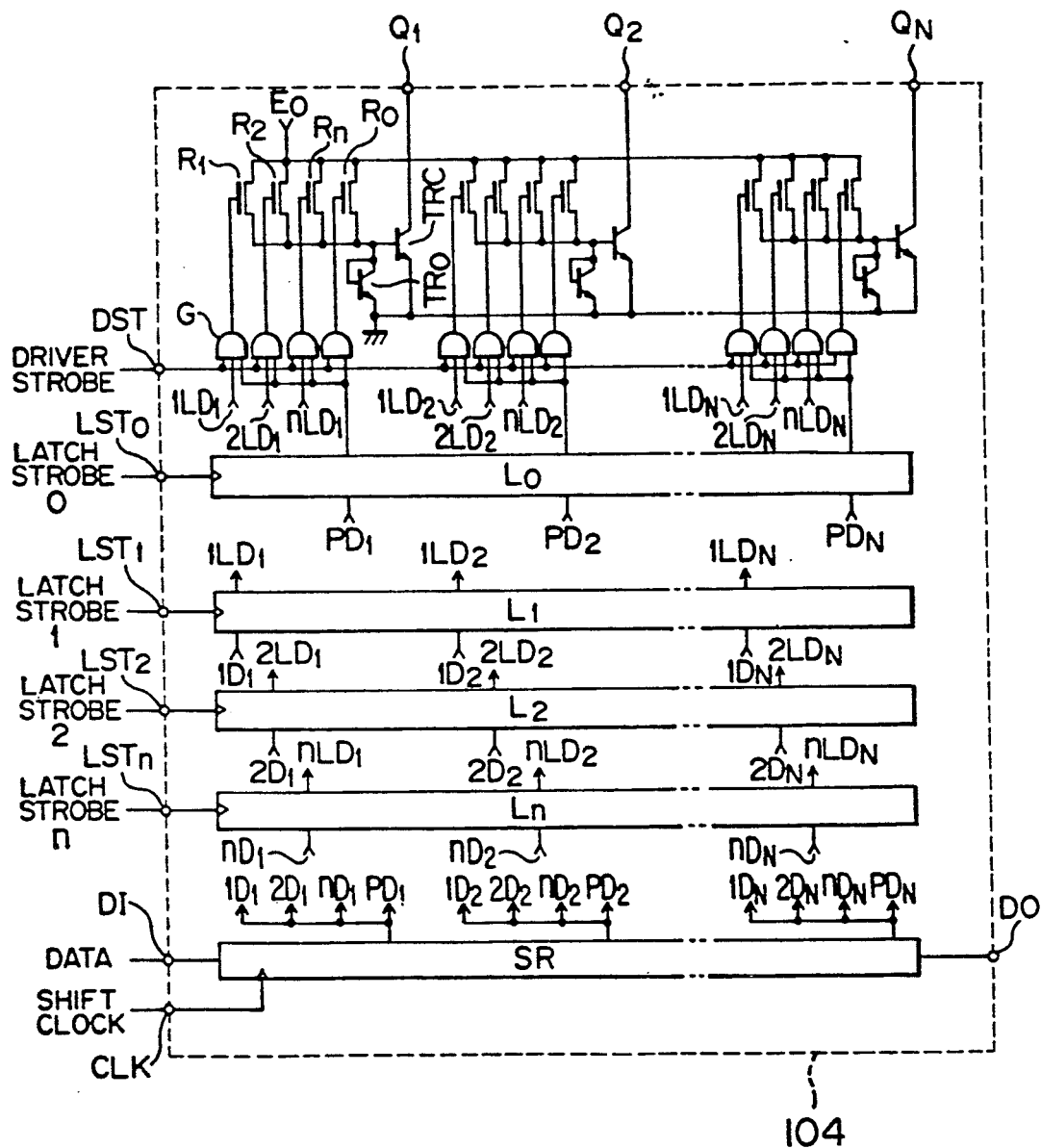

FIG. 6 shows the configuration of a driver IC 104 as a fifth embodiment according to the present invention in which the register associated with the data for controlling the output current comprises latch circuits. The constitution of FIG. 6 includes N-bit latch circuits $L_0, L_1, L_2, \ldots$, and $L_n$. Inputs of these latch circuits are associated with the outputs from the shift register SR which receives time-series data so as to effect a parallel output operation thereof. On the other hand, the outputs from the latch circuits $L_0$ to $L_n$ are delivered to the reference current source to control the current volume. The latch $L_0$ corresponds to the latch LATCH shown in FIGS. 1 to 4 and is associated with the image data, whereas the latches $L_1$ to $L_n$ are provided for the current control data.

The current control data is inputted from the terminal DI in synchronism with the shift clock, and when the data of the first bits related to the outputs $Q_1$ to $Q_N$ are entirely fetched into the shift register SR, if a signal latch strobe 1 is supplied to the terminal LST1, the data are stored in the latch $L_1$. In the same fashion, the current control data respectively associated with the bits ranging from the second bit to the n-th bit are stored in the latches $L_2$ to $L_n$, respectively. Since the outputs from the latches $L_1$ to $L_n$ are connected via the pertinent gates Gs to the MOS transistors $R_1$ to $R_n$, respectively, as described in conjunction with the operations of the fourth embodiment, the output current volume (i.e. current level) of each of the outputs $Q_1$ to $Q_N$ is controlled with the n-bit current control data thus stored.

Figure 7:
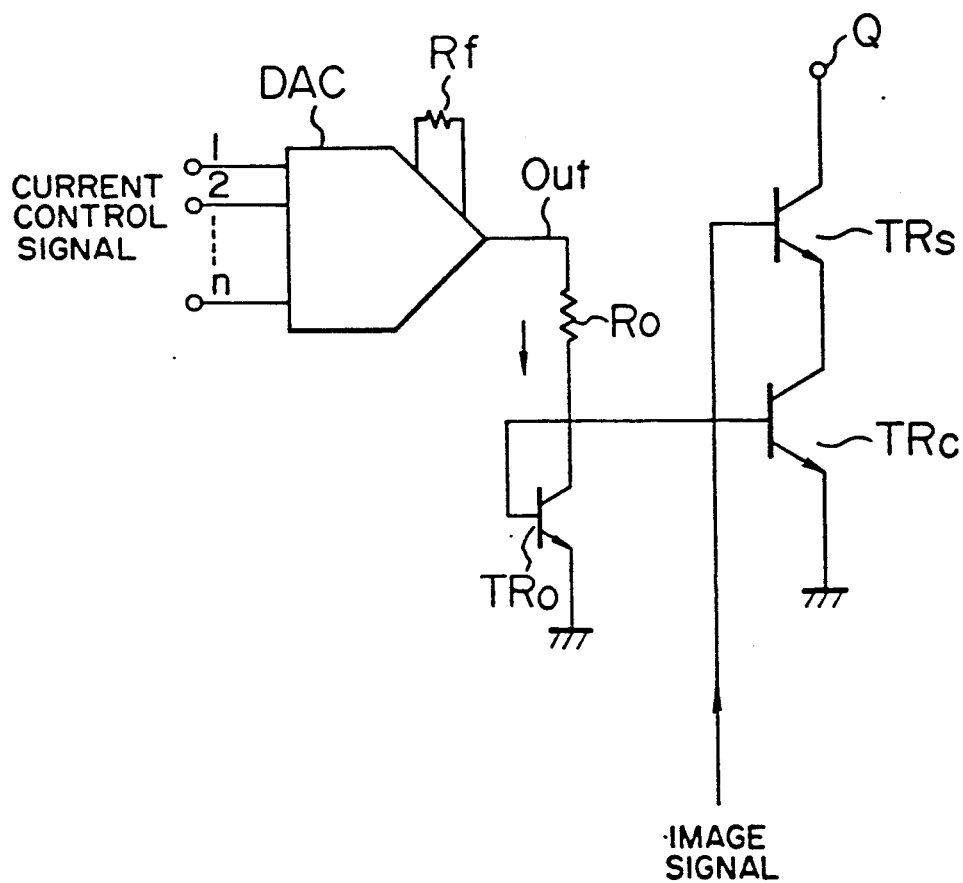
FIG. 7 is a circuit diagram schematically showing an embodiment employing a digital-to-analog (D/A) converter as select means.

FIG. 7 shows a sixth embodiment according to the present invention in which a digital-to-analog converter (DAC) is employed as select means.

In the configuration of FIG. 7, DAC indicates a digital-to-analog converter, and the other components are the same as those of the preceding embodiments and hence are omitted. The converter DAC functions as a reference voltage source supplying a reference current I to the current mirror circuit. Incidentally, the DAC is preferably formed in a single semiconductor substrate together with transistors $TR_0$ and TRC, and the like. An input of the DAC is supplied with a current control signal in the form of digital data of the current to be conducted such that a light emission power of a constant value is attained depending on the characteristic, associated with the relationship between the light emission power and the current conducted, of the light-emitting diode array to be connected. As a result, an output from the DAC is established so as to flow the reference current I to the transistor $TR_0$ constituting the current mirror circuit. The transistors TRC and TRS operate as described in this specification. It is preferable to provide the converter DAC for each output Q of the driver IC; however, the converter DAC may be arranged for each chip. In short, the DAC need only be arranged within the allowable size range of the driver IC to be finally implemented.

The digital-to-analog converter DAC enables an accurate reference voltage or current to be selected in detail. Furthermore, since an absolute value thereof is adjustable by means of an adjusting resistor Rf externally disposed, the setting range of the reference current can be expanded. As described above, according to the embodiment using the DAC, the adjustment of the conducting current of the light-emitting diode array is effected with a high precision so as to obtain a constant light emission power and hence the fluctuation in the brightness is removed; consequently, when the embodiment is applied to an electronic photograph apparatus, an electronic photograph image is developed without causing the variation in the density.

According to the first, second, third, fourth, fifth, and sixth embodiments, since the output current volume (current level) is controllable with a digital signal, there can be effected a driver operation to remove the variation in the light emission power among the light-emitting elements. In addition, since the change of the light emission power of the light-emitting elements with the lapse of time also becomes correctable, an electronic photograph image can be attained in any case with a high quality, namely, with a constant density and without the variation in the density.

Prior to description of a seventh embodiment according to the present invention, a comparison example of the prior art as the background of the present invention will be described for easier understanding of the present invention with reference to FIGS. 10 to 13.

In the driving circuit of the light-emitting diode (LED) array, when the array becomes to be of a high density, the density of connection points with the driver ICs is also increased and hence the connection cannot be easily achieved. In order to avoid this disadvantageous situation, there has been adopted a method in which leader electrodes of the LED array are alternately drawn to the opposing sides of the LED array for each dot in a so-called zigzag form. The driver ICs are accordingly arranged on both sides of the LED array. The driver IC has a driver circuit associated with each element of the LED array; however, in order to minimize the number of input terminals, the light emission data is in general serially inputted through a terminal or several terminals so as to be outputted to the respective driver circuits.

Figure 11:
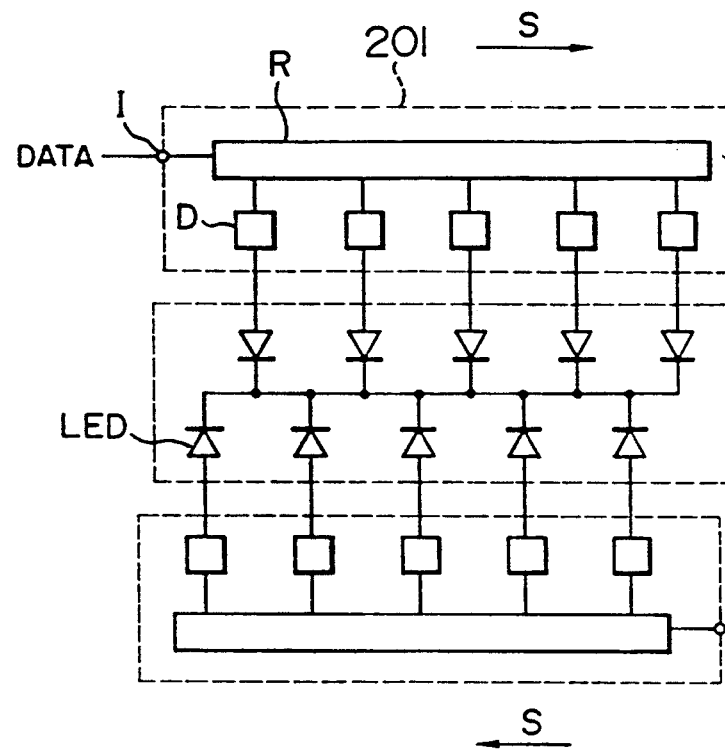
FIG. 11 is an explanatory diagram for explaining the conventional method of driving the light-emitting diode array.

Let us consider here the case where the same driver ICs are located on both sides of the LED array for the driving operation. In this case, the configuration of the system will become as shown in FIG. 11. In this configuration, a data input terminal I of a driver IC 1 including a register R for the serial-to-parallel conversion and a driver D is located at a symmetric point on the respective side of the LED array with respect to the center thereof, which causes the shift direction S of the data to be reversed. As a result, in order to align the sequence of data in the LED array, it is necessary to reverse the sequence of input data of one of the driver ICs, which is troublesome for the data scan operation. Consequently, the driver ICs capable of a bidirectional scanning of data are employed so that the data scan is accomplished in both directions from the right and from the left.

Figure 12:
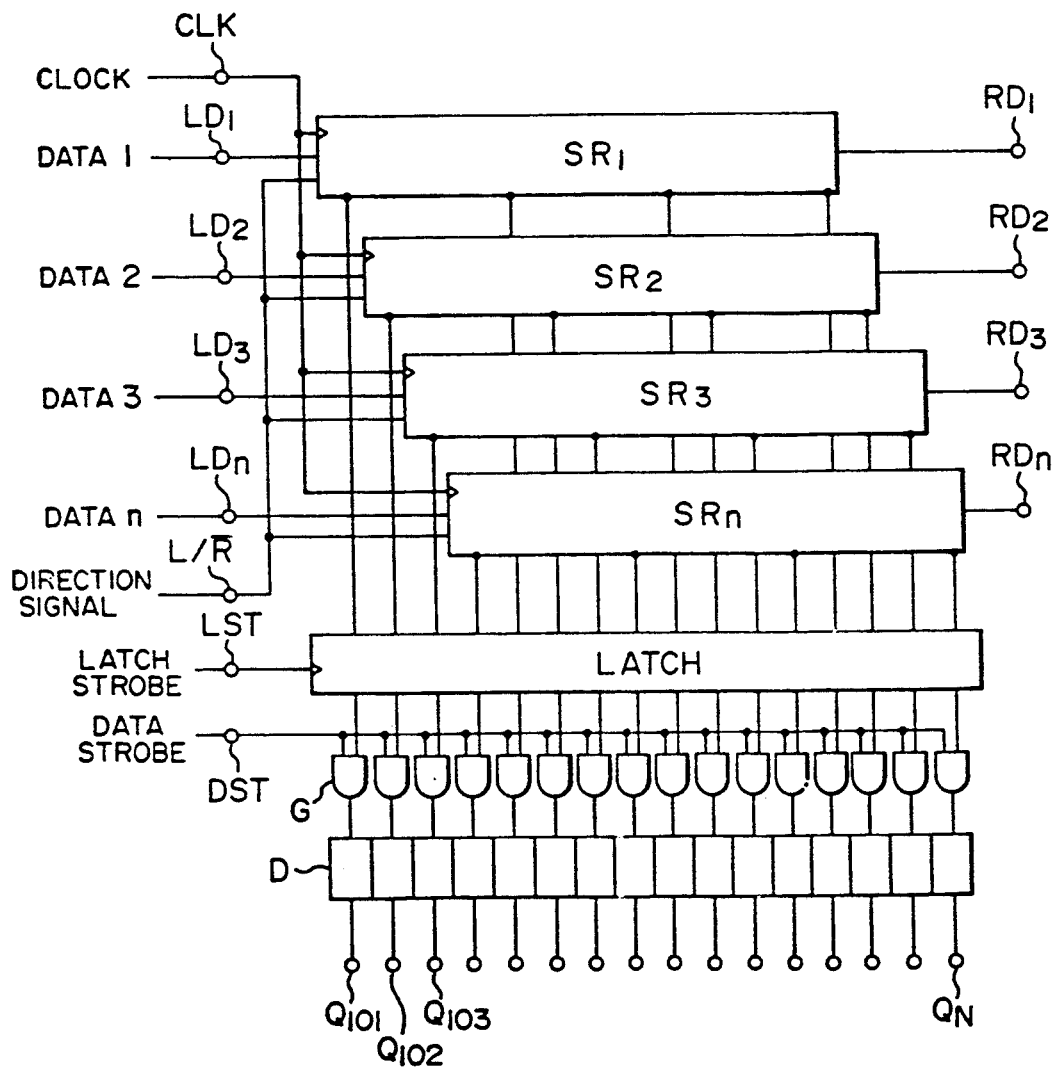

FIG. 12 shows the configuration of the driver IC above. In this constitution, SR, and SRn are, respectively, groups of bidirectional shift registers for sequentially receiving serial data from n positions, LATCH designates a latch in which data outputted through a serial-to-parallel conversion of the respective shift register is temporarily held, and G indicates a gate which opens and closes a route of the light emission data to the driver D and determines a period of light emitting time of the LED array to be driven.

Figure 13:
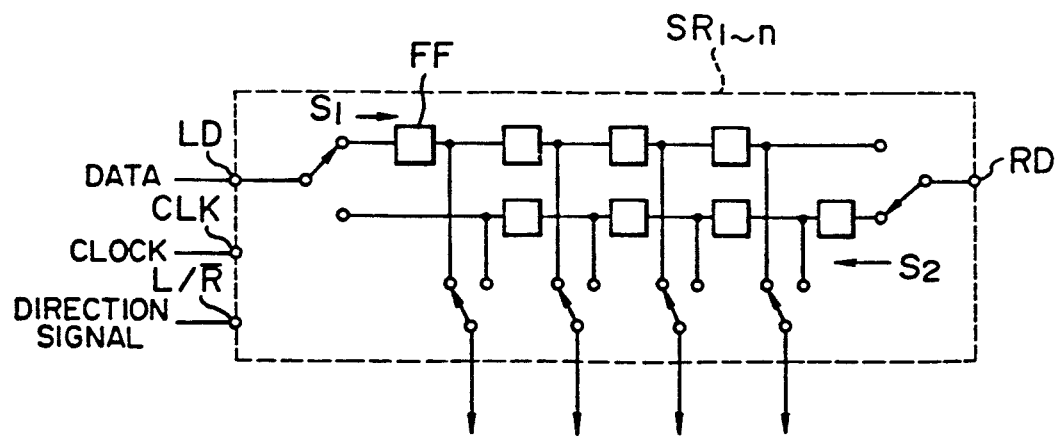
FIGS. 12 and 13 are circuit diagrams showing configuration examples of the conventional driver IC associated with FIG. 11.

Each of the shift registers $SR_1$ to $SR_n$ includes a logic circuit constitution as shown in FIG. 13. There are disposed two channels of shift registers comprising flip-flop circuits (FFs) and having the opposite shift directions. When supplying data to a terminal LD, a direction change-over signal "1" is delivered to a terminal L/$\overline{R}$ so as to select the shift register of the upper stage, thereby sequentially fetching data in the $S_1$ direction in synchronism with the shift clock. When the terminal RD is used as the data input terminal, a signal "0" is supplied to the terminal L/$\overline{R}$ so as to fetch data through the shift register of the lower stage in the $S_2$ direction.

When the data is fetched into a predetermined location of the register, if a latch strobe signal is inputted to the terminal LST, the data of the shift register is latched to be held in the LATCH. During the hold time, when a driver strobe signal is supplied to the terminal DST, the driver D is set to a conductive state in accordance with the hold data. Namely, the LED array connected to the terminals $Q_{101}$ to $Q_N$ starts blinking. Consequently, there arises the latter problem described above.

Figure 8:
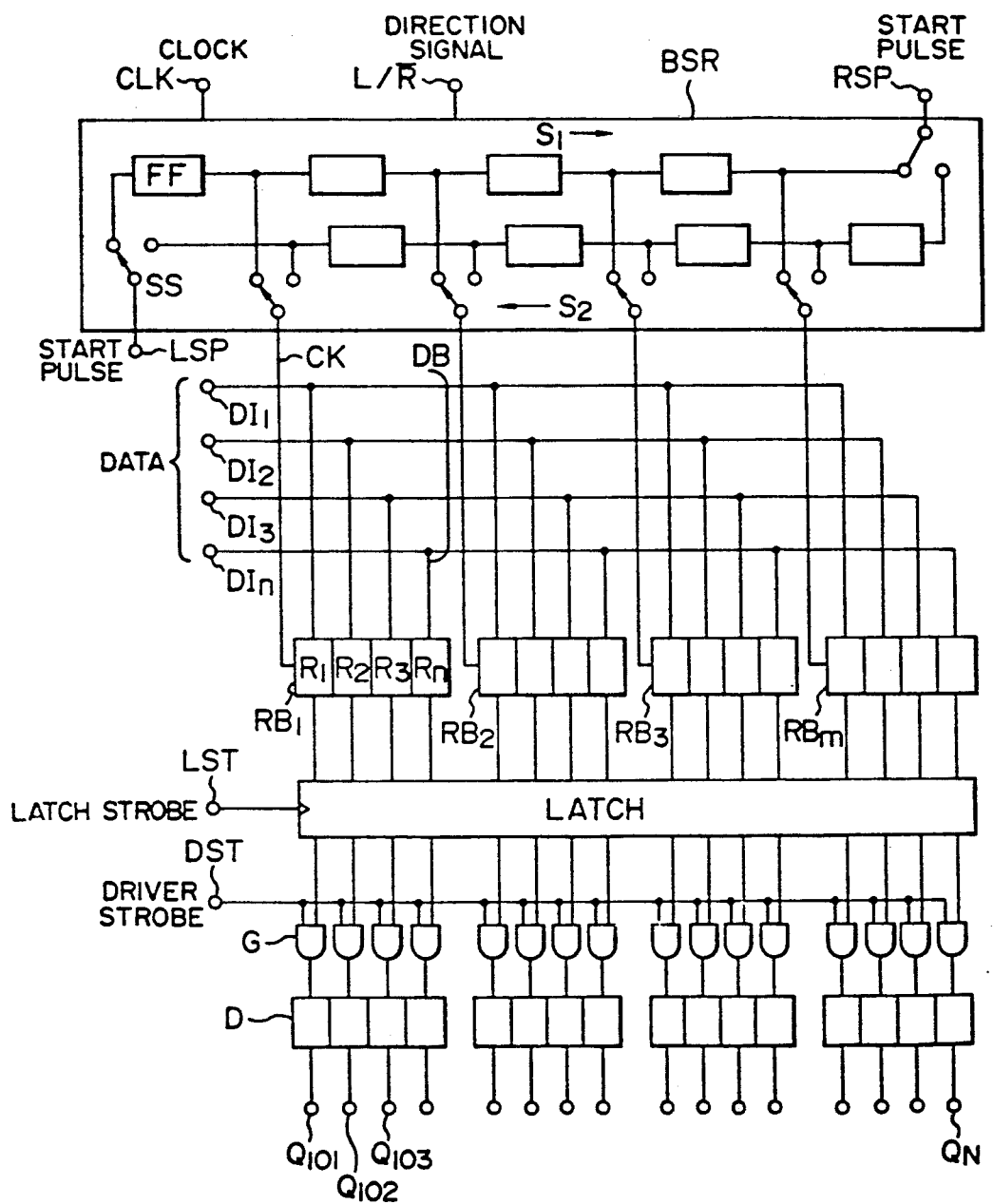
FIG. 8 is a circuit configuration diagram showing further another embodiment according to the present invention.
Figure 9:
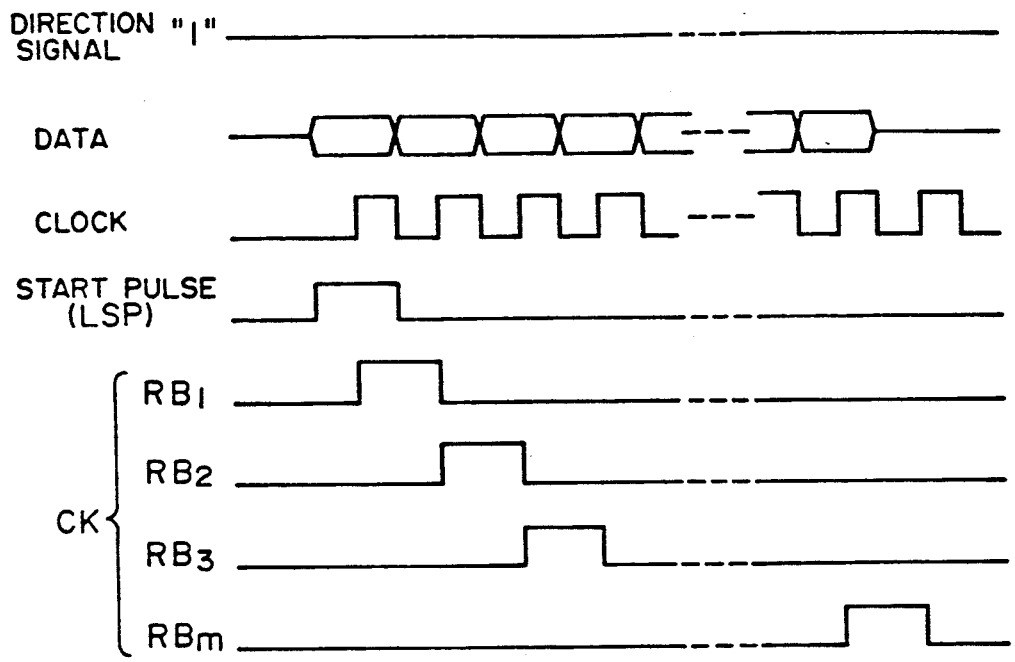
FIG. 9 is a timing chart useful to explain operations of the embodiment of FIG. 8.
Figure 9:
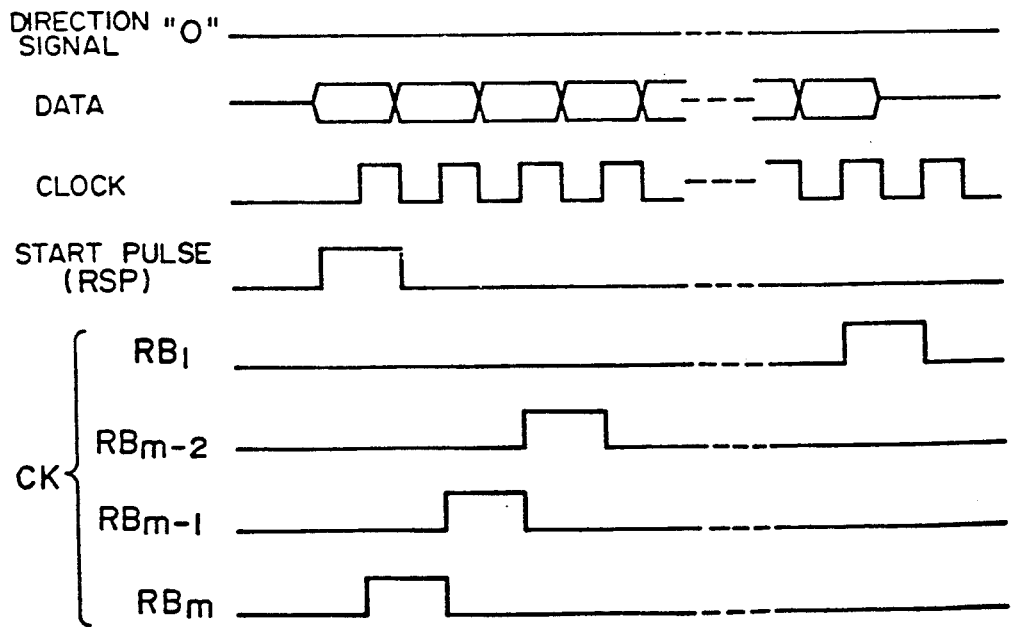
Figure 10:
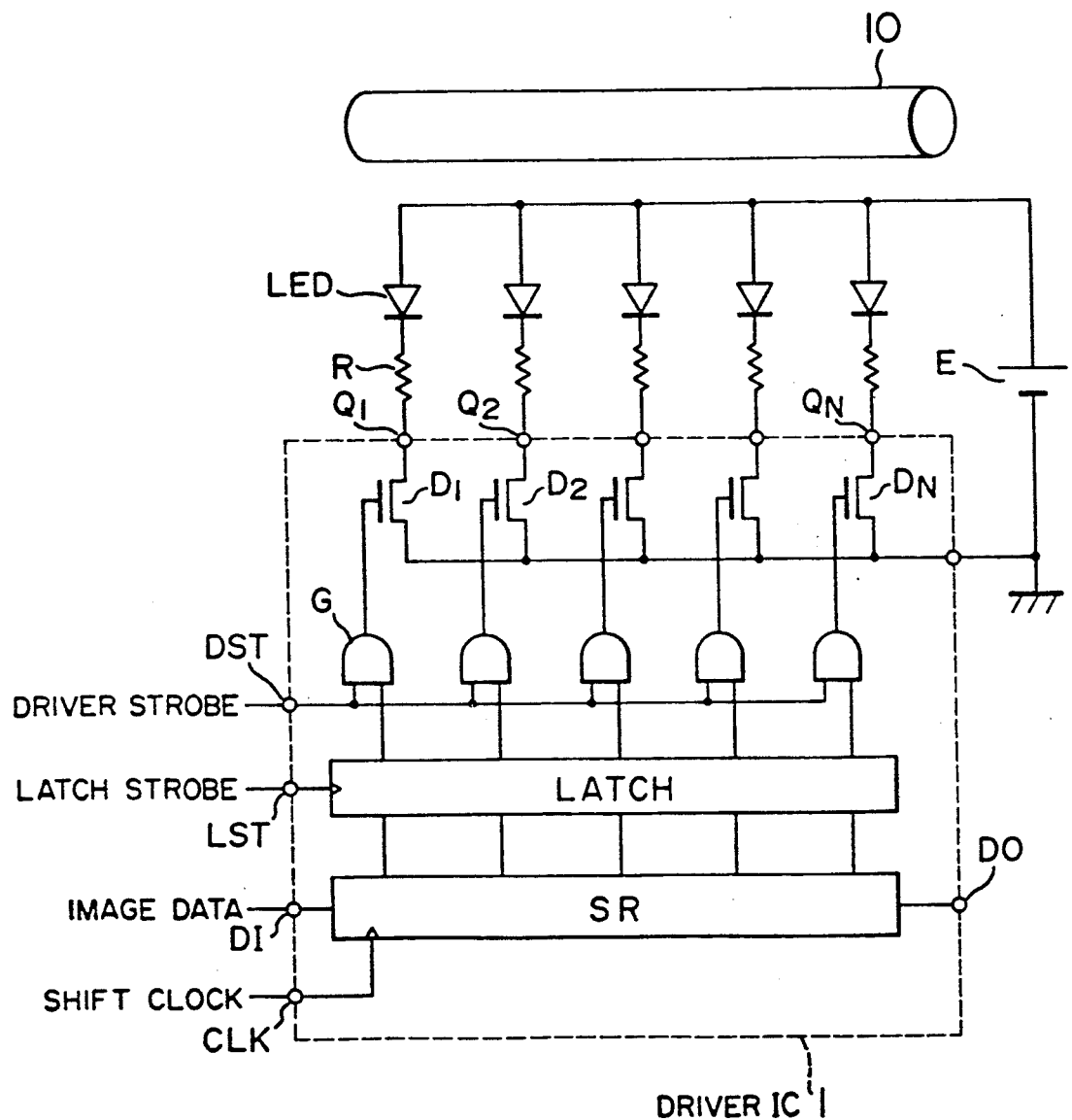
FIG. 10 is a circuit diagram showing an example of a conventional light-emitting diode array driver circuit.

Description will be given of a seventh embodiment to solve the problem according to the present invention. FIG. 8 shows the constitution of a driver IC according to the present invention, whereas FIG. 9 is a timing chart showing the operation of the driver IC. The configuration of FIG. 8 includes an n-bit data bus DB having input terminals $DI_1$ to $DI_n$, m register blocks $RB_1$ to $RB_m$, a latch LATCH of n·m (=N) bits, a bidirectional shift register BSR, an AND gate G, and a driver D for driving an LED array.

The register block comprises n separate registers, which are arranged from the left to the right according to the numbers of the data input terminals $DI_1$ to $DI_n$ to be connected. A timing signal CK enabling the register block is issued from the bidirectional shift register BSR, which comprises two channels of shift registers and having the opposite shift directions. The shift direction thereof is selected depending on a signal "1" or "0" supplied to the terminal L/$\overline{R}$.

Let us first consider the case where a data scan is accomplished to output data from the terminal $Q_{101}$ in an ascending order of data. In this operation, a signal "1" is supplied to the terminal L/$\overline{R}$ to select the shift register in the upper stage of the bidirectional shift register BSR. Matching the order of data numbers with that of the data input terminal numbers, data is sequentially supplied to the data bus DB in a unit of n bits in synchronism with the clock inputted from the terminal CLK. When a start pulse as shown in FIG. 9 is inputted to the terminal LSP at the same timing, the clock signal is transmitted in the direction $S_1$, and the output CK enables the register blocks in the direction from the left, namely, in the sequence of $RB_1$, $RB_2$, ..., and $RB_n$. As a result, the data is sequentially stored in the respective register blocks in the direction from the left to the right, each register block loaded with N bits. Thereafter, the driving operation can be achieved to match the order of the data numbers with that of the output terminal numbers only through the operations of the latch LATCH, the gate G, and the driver D as described above.

Next, description will be given of the case where the data scan is carried out so as to output data to the output terminals $Q_N$ on the right side in the ascending order of the data numbers. When the terminal L/$\overline{R}$ is set to "0" and a start pulse is supplied to the terminal RSP, the shift register of the lower stage is selected such that the register blocks are sequentially enabled in the direction of $S_2$ from $RB_n$ on the right side to $RB_1$ on the left side. In this situation, when the data input to the data bus DB is achieved with the number of each DI and that of each data reversed, the data is fetched in the register blocks in a direction from the right to the left. Consequently, in the output operation, the sequence of the data and that of the output terminal numbers are reversed, namely, the data scan direction becomes to be opposite to that described above.

In the foregoing description, the bidirectionality of the data scan is accomplished according to the operations of the components up to the register blocks, and the number of registers necessary here is given by the total of the bidirectional shift registers and the register blocks RBs, namely, n·m+2m. In contrast with this method, according to the method of FIG. 12, the number of registers necessary to attain the bidirectionality of the data scan is 2n·m, which has a ratio of ½(1+2/n) to the number of registers required in the method above. In a constitution of n=8 bits, the number of the registers is reduced by 37% and hence the size of the driver IC can be minimized corresponding to the reduction, which enables the cost thereof to be lowered.

In addition, in the conventional example, the data terminals are doubled to attain the bidirectionality; however, according to the embodiment above, only two input terminals are additionally disposed for the start pulse and hence the increase in the number of terminals can be prevented, which also contributes to the reduction of the size of the driver IC. As described above, in the driver IC according to the present invention, the circuit size and the number of input terminals are minimized and consequently the cost thereof is reduced.

According to the seventh embodiment above, since the size of the IC can be decreased as compared with the prior-art example, a convenient driver IC having a bidirectional data scanning function can be manufactured at a low cost.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. A driver for a light-emitting diode array including a plurality of light-emitting diodes for processing image data comprising:

plural driver circuits including means for controlling the driving current level and the ON/OFF switching of said plurality of light-emitting diodes;

a data bus comprised of n-bit lines for transmitting binary data indicative of the image data, n being a positive integer greater than 1;

a group of register blocks, wherein each register block is comprised of n registers and each of said n registers is coupled to provide image data stored therein to a respective one of said plural driver circuits, each register block of the group of register blocks is coupled in a predetermined coupling order to each bit line of the n-bit lines of said data bus and each of the n registers of each register block is coupled to receive binary data from a respective one of the n-bit lines of said data bus in accordance with application of timing signals; and bidirectional shifting means including a plurality of stages for selectively effecting signal transfer in either of two opposing directions and generating said timing signals sequentially at outputs of said stages, wherein the outputs of said stages are selectively coupled in groups to respective ones of said register blocks in accordance with the direction of signal transfer by said bidirectional shifting means.

2. A driver circuit according to claim 1, wherein said bidirectional shifting means includes a bidirectional shift register including two groups of an equal number of series coupled stages, comprised from said plurality of stages, for effecting signal transfer in said two opposing directions, respectively, and wherein the direction of signal transfer is effected by a direction control signal which selectively allows a start pulse signal to be transferred in a first direction through a first of the two groups of said series coupled stages or in a second, opposing direction through the second of the two groups of stages thereof, the outputs of the respective stages of said first group or of said second group are coupled to respective ones of said register blocks in accordance with the transfer direction selected by said direction control signal.

3. A driver circuit according to claim 2, wherein said first group and said second group each include a corresponding number of stages equal in number to the number of register blocks in said group of register blocks.

4. A driver circuit according to claim 3, wherein each register block is coupled to provide image data stored in the n registers thereof to a respective one of said plural driver means.

5. A driver circuit according to claim 4, wherein each of said plural driver means includes n switching circuits for controlling application of drive currents to a corresponding number of light-emitting diodes.

6. A driver circuit according to claim 5, wherein said n switching circuits are comprised of bipolar transistor switches, respectively.

7. A driver circuit according to claim 5, wherein in each of said plural driver means each of said n switching circuits is combined with a separate current mirror circuit which is responsive to means for effecting control of the level of drive current of a corresponding one of said plurality of light-emitting diodes.

8. A driver circuit according to claim 7, wherein said n switching circuits and each current mirror circuit are comprised of bipolar transistors.

9. A driver circuit according to claim 5, wherein in each of said plural driver means said n switching circuits are comprised together with a single current mirror circuit arrangement which has a controlling section and an output section coupled to control the drive current of corresponding n light-emitting diodes.

10. A driver circuit according to claim 9, wherein the output section of said current mirror includes n output transistors which are respectively coupled to the corresponding n light-emitting diodes for controlling the drive currents thereof upon the n light-emitting diodes being selectively activated by corresponding ones of said n switching circuits in response to stored image data in a corresponding register block.

11. A driver circuit according to claim 10, wherein each of said n switching circuits includes a switching transistor having a control input responsive to stored data at a respective one of the n registers of said corresponding register block.

12. A driver circuit according to claim 11, wherein said switching transistor and said current mirror are comprised of bipolar transistors.

13. A driver for a light-emitting diode array according to claim 1, wherein said plurality of light-emitting diodes are arranged as a single row of light-emitting diodes.

14. A driver for a light emitting-diode array according to claim 13, wherein said plurality of register blocks are arrayed such that data is sequentially stored in the respective register blocks in a direction corresponding to the signal transfer direction of said bidirectional shifting means, and wherein each register block stores up to n bits of binary image data in said n registers, respectively, received via said n-bit lines in response to a timing signal outputted by a corresponding stage of a selected one of two groups of stages of said bidirectional shifting means, each one of said two groups corresponds to a signal transfer in one of the two opposing directions.

15. A driver for a light-emitting diode array according to claim 14, wherein said register blocks are arrayed in a single row.

16. A driver for a light-emitting diode array according to claim 15, further including a data latch and gate means for holding data provided by said register blocks in accordance with a latch strobe signal and controllably feeding the held data to said plural driver circuits in response to a driver strobe signal, respectively.

17. A driver for a light-emitting diode array according to claim 16, wherein each driver circuit is comprised of a current mirror circuit and a switching transistor.

18. A driver for a light-emitting diode array according to claim 16, wherein said plural driver circuits are disposed as n groups of driver circuits, and wherein each such group of driver circuits is correspondingly associated with a single current mirror including n output transistors and n switching transistors, said n switching transistors effecting ON/OFF operation of corresponding n light-emitting diodes.

* * * * *